April 13, 1926. 1,580,974
V. REMBOLD
AIR PREHEATER
Filed Dec. 9, 1921
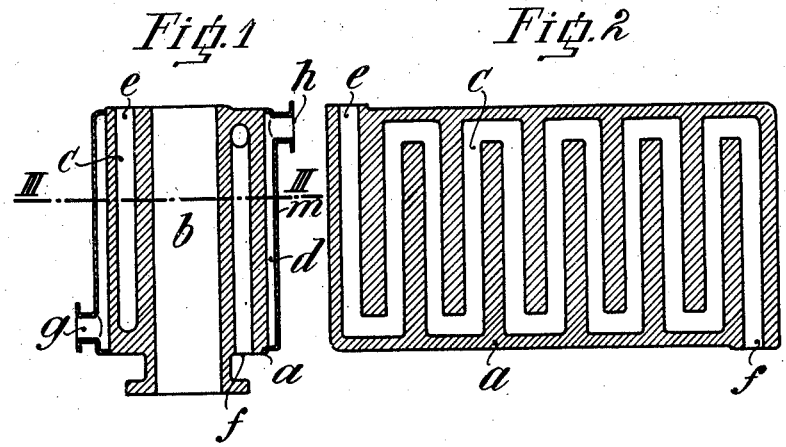
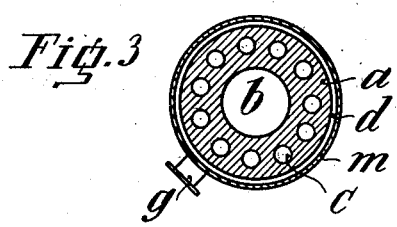
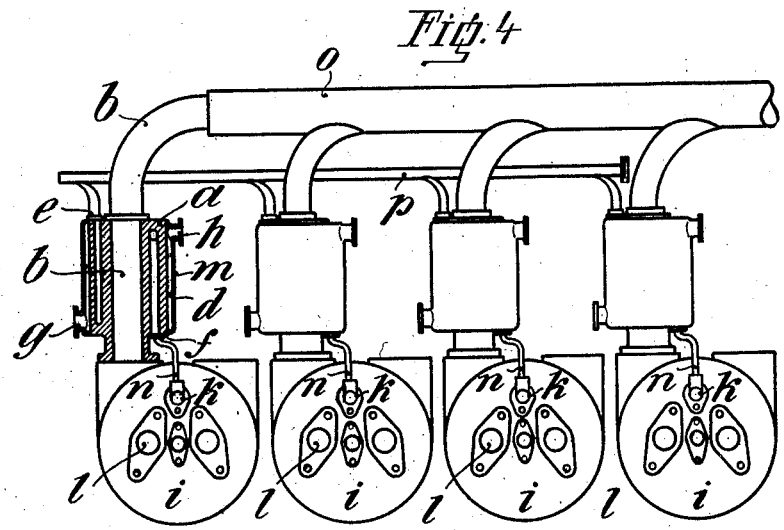
Witnesses:—
Edward Ma...
John Smith
INVENTOR:—
Viktor Rembold
By Chatwin & Company Patented Apr. 13, 1926.

1,580,974

UNITED STATES PATENT OFFICE.

VIKTOR REMBOLD, OF KIEL, GERMANY

AIR PREHEATER.

Application filed December 9, 1921. Serial No. 521,246.

*To all whom it may concern:*

Be it known that I, VIKTOR REMBOLD, a German citizen, residing at Kiel, in the German Republic, have invented new and useful Improvements in an Air Preheater, of which the following is a specification.

This invention relates to internal combustion engines. The high temperatures obtaining in the cylinders of such engines causes the internal walls of the cylinders to be highly heated, while the outer surfaces of the cylinders are greatly cooled down by air or water current. This condition produces in the interior of the walls of the cylinders such high stresses that often the material crystallizes and deteriorates.

This destructive action is greatly increased in reversible motors, such for example as ship's motors when the cold air introduced into the cylinders suddenly cools the hot walls of the cylinders.

It is common knowledge that in reversible ship's motors, the walls of the cylinders often become cracked and then render impossible any normal working condition or service.

The present object is to heat the starting air before its introduction into the cylinder. As in first starting the engine the cylinders are still cold and the said objections do not obtain, the heating of the air supply for the cylinders is only then necessary when, during cold weather, the temperature within the cylinders is to be raised for the purpose of facilitating ignition.

It is usual to heat the gas mixture by means of a heat storer connected with the exhaust conduit. It also is known in some instances to heat the air supply for internal combustion motors. The present object is and the novelty of the invention consists in the provision of a heat storer mounted on the exhaust pipe of and in promixity to each engine cylinder for heating the air supply which is provided for the starting of the engine.

The invention is shown in the accompanying drawings, in which:

Figure 1 is a vertical central section through a heat storer of the kind described; Figure 2 is a development showing the air passage; Figure 3 is a horizontal cross sectional view of the heat storer and Fig. 4 is a plan showing the invention applied to a four cylinder engine by way of example.

The heat storer $a$ comprises a centrally disposed tube portion $b$ forming part of the exhaust pipe from each motor cylinder, so that the exhaust gases pass immediately through the pipe $b$ which quickly becomes highly heated to the temperature of the exhaust gases and then passes the heat to the surrounding pipes. The heat storer $a$ is surrounded by a spaced casing $m$ which leaves an annular space $d$ forming a dead air space for preventing the loss of heat from the interior. The air supply to be heated enters by $e$ and circulates through the channels $c$ surrounding the tubular portion $b$ and leaves at $f$ in a hot condition. The channels $c$ are shown in Fig. 2 in a plane of development.

If it is desired to heat the air supply for the starting of the engine whilst the cylinder walls are still cold, arrangement is made for heating the heat storer $a$ by steam for example, by introducing the heating medium through a socket $h$ into the annular space $d$ and discharging same through a socket $g$. Any other means for heating same may be adopted.

It is of great importance to have the heat storer as close as possible to the outlet of the exhaust gas in each engine cylinder, because the gas is hottest at that point. Fig. 4 shows how this can be carried out by directly fixing the flange of the tube $b$ direct onto the motor cylinder $i$ and connecting the outlet from the storer with the exhaust chamber $o$.

Each cylinder $i$ of a multi-cylinder motor is provided with an inlet valve $k$ and an outlet valve $l$. The tube connection $n$ leads from the starting valve $k$ to the heat storer $a$. The compressed air pipe $p$ is connected with each inlet $e$ of the heat storers $a$ so that the heated air leaving at $f$ flows through $n$ and $k$ into the corresponding cylinder. In placing the heat storer $a$ closely to each cylinder $i$ a further advantage is obtained in that the pipe connection $n$ for the hot air supply is reduced as far as possible and prevents the loss of heat.

Further, it is of importance to choose an adequately proportioned heating surface for the heat storer with reference to the heat discharging surface containing the starting air supply for the cylinders. The surface for absorbing the heat, should, therefore, not be too large in comparison with the surface serving in distributing the heat to the circulating air supply, because in shutting down the motor the air, sucked in by each cylinder $i$, receives no longer any fresh fuel and becomes comparatively cold before it escapes into the exhaust, while during the first few starting strokes, a further amount of cold air passes through the exhaust pipe. In such a case the air passing through the exhaust $b$ would absorb too much heat from the heat storer $a$.

In thus heating the starting air a greater working coefficient is obtained from the air which results in an important economy in the air supply.

I claim:

An air preheater comprising a body portion provided with a central passage through which the exhaust gases are adapted to pass, an annular passage formed in the wall of said body portion around said central passage through which the air to be heated is adapted to pass, and a chamber surrounding said annular passage adapted to receive a heating fluid and being spaced therefrom by a wall of heat transmitting material, said wall being the body portion of said preheater.

VIKTOR REMBOLD.